United States Patent
Kakiuchi et al.

(10) Patent No.: US 9,863,028 B2
(45) Date of Patent: Jan. 9, 2018

(54) HIGH-STRENGTH HOT-DIP GALVANIZED STEEL SHEET HAVING EXCELLENT YIELD STRENGTH AND FORMABILITY

(71) Applicant: Kobe Steel, Ltd., Kobe-shi (JP)

(72) Inventors: Elijah Kakiuchi, Kobe (JP); Toshio Murakami, Kobe (JP); Katsura Kajihara, Kobe (JP); Tatsuya Asai, Kakogawa (JP); Naoki Mizuta, Kakogawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 360 days.

(21) Appl. No.: 14/413,471

(22) PCT Filed: Jun. 26, 2013

(86) PCT No.: PCT/JP2013/067476
§ 371 (c)(1),
(2) Date: Jan. 8, 2015

(87) PCT Pub. No.: WO2014/010415
PCT Pub. Date: Jan. 16, 2014

(65) Prior Publication Data
US 2015/0184274 A1 Jul. 2, 2015

(30) Foreign Application Priority Data

Jul. 12, 2012 (JP) ................................. 2012-156577

(51) Int. Cl.
| | |
|---|---|
| *C22C 38/02* | (2006.01) |
| *C22C 38/04* | (2006.01) |
| *C22C 38/06* | (2006.01) |
| *C22C 38/14* | (2006.01) |
| *B32B 15/01* | (2006.01) |
| *B32B 15/18* | (2006.01) |
| *C23C 2/06* | (2006.01) |
| *C23C 2/28* | (2006.01) |
| *C21D 9/46* | (2006.01) |
| *C22C 38/00* | (2006.01) |
| *C22C 38/08* | (2006.01) |
| *C22C 38/12* | (2006.01) |
| *C22C 38/16* | (2006.01) |
| *C22C 38/18* | (2006.01) |
| *C21D 8/02* | (2006.01) |
| *C23C 2/02* | (2006.01) |

(52) U.S. Cl.
CPC .............. *C23C 2/06* (2013.01); *B32B 15/013* (2013.01); *C21D 8/0205* (2013.01); *C21D 8/0226* (2013.01); *C21D 8/0236* (2013.01); *C21D 8/0263* (2013.01); *C21D 8/0273* (2013.01); *C21D 9/46* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C23C 2/02* (2013.01); *C23C 2/28* (2013.01); *C21D 2211/001* (2013.01); *C21D 2211/005* (2013.01); *C21D 2211/008* (2013.01); *Y10T 428/12799* (2015.01)

(58) Field of Classification Search
None
See application file for complete search history.

(56) References Cited

U.S. PATENT DOCUMENTS

| | | |
|---|---|---|
| 7,468,109 B2 | 12/2008 | Kashima |
| 7,591,977 B2 | 9/2009 | Ikeda et al. |
| 7,767,036 B2 | 8/2010 | Kashima et al. |
| 7,887,648 B2 | 2/2011 | Kinugasa et al. |
| 8,197,617 B2 | 6/2012 | Nakaya et al. |
| 8,343,288 B2 | 1/2013 | Murakami et al. |
| 8,597,439 B2 | 12/2013 | Ikeda et al. |
| 8,673,093 B2 | 3/2014 | Ikeda et al. |
| 8,679,265 B2 | 3/2014 | Murakami et al. |
| 8,840,738 B2 | 9/2014 | Murakami et al. |
| 8,876,986 B2 | 11/2014 | Hata et al. |
| 9,074,272 B2 * | 7/2015 | Akamizu ................ C22C 38/02 |

(Continued)

FOREIGN PATENT DOCUMENTS

| | | |
|---|---|---|
| EP | 2 105 514 A1 | 9/2009 |
| EP | 2 256 224 A1 | 12/2010 |

(Continued)

OTHER PUBLICATIONS

International Search Report and Written Opinion of the International Searching Authority dated Sep. 17, 2013 in PCT/JP13/067476 Filed Jun. 26, 2013.
U.S. Appl. No. 14/377,354, filed Aug. 7, 2014, Kakiuchi, et al.
Extended European Search Report dated Mar. 11, 2016 in Patent Application No. 13816472.8.

* cited by examiner

*Primary Examiner* — Deborah Yee
(74) *Attorney, Agent, or Firm* — Oblon, McClelland, Maier & Neustadt, L.L.P.

(57) ABSTRACT

A hot-dip galvanized steel sheet contains specific amounts of C, Si, Mn, P, S, Ti, Al, and N with the remainder being iron and unavoidable impurities. Bainitic ferrite, martensite, retained γ, and ferrite (α) are present each in a specific area ratio. The remainder γ has a specific C concentration. Sub-grains in the recrystallized α and un-recrystallized α have a specific grain diameter. The surface area ratio of α and worked α having a grain diameter of 5 μm or more is 5% or less. The average particle diameter of TiC particles inside α grains is 10 nm or less.

13 Claims, No Drawings

(56) References Cited

U.S. PATENT DOCUMENTS

| | | |
|---|---|---|
| 2005/0150580 A1 | 7/2005 | Akamizu et al. |
| 2008/0251160 A1 | 10/2008 | Akamizu et al. |
| 2009/0053096 A1 | 2/2009 | Miura et al. |
| 2009/0242085 A1 | 10/2009 | Ikeda et al. |
| 2009/0277547 A1 | 11/2009 | Saito et al. |
| 2010/0080728 A1 | 4/2010 | Ikeda et al. |
| 2010/0221138 A1* | 9/2010 | Nakaya ............ C21D 9/46 420/84 |
| 2011/0008647 A1* | 1/2011 | Azuma ............ C21D 8/04 428/659 |
| 2013/0022490 A1 | 1/2013 | Hata et al. |
| 2013/0236350 A1 | 9/2013 | Kakiuchi et al. |
| 2013/0259734 A1 | 10/2013 | Kakiuchi et al. |
| 2013/0330226 A1 | 12/2013 | Murakami et al. |
| 2014/0271331 A1 | 9/2014 | Murakami et al. |

FOREIGN PATENT DOCUMENTS

| | | |
|---|---|---|
| JP | 2006-274417 | 10/2006 |
| JP | 2007-39749 | 2/2007 |
| JP | 2007-182625 | 7/2007 |
| JP | 2010-65272 A | 3/2010 |
| JP | 2011-140686 | 7/2011 |
| KR | 10-2009-0122372 A | 11/2009 |
| WO | 2013/005714 | 1/2013 |
| WO | 2013/018739 | 2/2013 |

HIGH-STRENGTH HOT-DIP GALVANIZED STEEL SHEET HAVING EXCELLENT YIELD STRENGTH AND FORMABILITY

TECHNICAL FIELD

The present invention relates to a high strength hot-dip galvanized steel sheet excellent in yield strength and formability used, for example, in automobile parts, and a manufacturing method therefor.

BACKGROUND ART

Hot-dip galvanized steel sheets used in automobile under body parts are required for further reduction of thickness in order to realize improvement in the fuel cost. For making the thickness reduction of the steel sheet and ensure for parts strength compatible, it has been demanded to increase the tensile strength (TS) of the hot-dip galvanized steel sheet to 1000 MPa or more. Further, in consideration of safety upon collision, it is also demanded to further increase the strength of the steel sheet to a yield strength (YS) of 700 MPa or more. Further, excellent formability is also demanded for the steel sheet in order to be fabricated into underbody parts of complicate configuration. Accordingly, those having a balance of tensile strength (TS) and elongation (total elongation: EL) (hereinafter referred to as "TS×EL balance") of TS×EL of 24,000 MPa·% or more are demanded.

As a method of improving TS×EL, it has been known to utilize deformation induced martensitic transformation (TRIP effect) of retained austenite (hereinafter also referred to "retained γ"). In the hot-dip galvanized steel sheet, retained γ is generally prepared by an austempering step in a continuous galvannealing line (hereinafter referred to as "CGL"). A matrix is generally classified into those containing and not containing soft ferrite. When the matrix contains ferrite, a steel sheet is excellent in TS×EL but YS is low since ferrite yields preferentially and it was difficult to ensure YS of 700 MPa or more. Ferrite yields preferentially because ferrite is soft in itself and, in addition, mobile dislocations are introduced into the soft ferrite due to expansion of the martensite formed mainly in the final cooling after the alloying treatment during its formation and the mobile dislocations tend to move easily thereby causing plastic deformation at a low stress. On the other hand, when the matrix does not contain the ferrite, there was a problem that a TS×EL balance was poor although YS was excellent. While the TS×EL balance can be improved by making an austempering time longer, the overaging zone for austempering in CGL is generally short and, if the austempering time is increased, this lowers the line speed and deteriorates the productivity. Accordingly, it has been strongly demanded for the development of hot-dip galvanized steel sheets at high productivity (can be manufactured in short austempering time (for example, even within 60 s) and having excellent mechanical properties (hereinafter also referred to simply as properties).

For example, Patent Literature 1 discloses a high strength galvanized steel sheet comprising a bainitic ferrite as a matrix and excellent in the balance of the strength and the workability. However, although the steel sheet achieves TS, YS, and TS×EL at a high level identical with that of the present invention (refer to Experiment No. 28 in Table 4), this involves a problem that the productivity in CGL is poor since this requires an austempering time exceeding 100 s (refer to paragraph [0041]).

On the other hand, Patent Literature 2 discloses an alloyed high strength hot-dip steel sheet excellent in an anti-powdering property. However, while the steel sheet can be manufactured within an austempering time as short as 45 s (refer to paragraph [0124]), some existent steels containing a considerable amount of ferrite satisfy TS×EL of 24000 MPa·% or more, but TS of 1000 MPa or more cannot be ensured (refer to GA steel sheets No. 18 to 23, 25, 36 in Table 5) and it is considered that YS of 700 MPa cannot be ensured. Further, while steels scarcely containing the ferrite may possibly ensure YS of 700 MPa or more, they cannot ensure TS×EL of 24,000 MPa·% or more (refer to GA steel sheets Nos. 27 to 32, 37 to 40, 45, and 46 in Table 5).

CITATION LIST

Patent Literature

PTL 1: Japanese Patent Application Laid-Open No. 2006-274417

PTL 2: Japanese Patent Application Laid-Open No. 2007-182625

SUMMARY OF INVENTION

Technical Problem

The present invention has been accomplished in view of the situations described above and it intends to provide a high strength hot-dip galvanized steel sheet that can be manufactured by austempering in a short time by CGL and having both tensile strength and yield strength, and formability, as well as a manufacturing method therefor.

Solution to Problem

The invention of claim 1 provides a high strength hot-dip galvanized steel sheet excellent in yield strength and formability, having a steel sheet with a galvanized layer formed on the surface, the steel sheet containing a component composition by mass % (identical here and hereinafter for chemical composition), C: 0.05 to 0.3%,
Si: 1 to 3%,
Mn: 1 to 3%,
P: 0.1% or less (inclusive 0%),
S: 0.01% or less (inclusive 0%).
Ti: 0.02 to 0.2%,
Al: 0.001 to 0.1%,
N: 0.002 to 0.03%, and
the balance consisting of iron and unavoidable impurities, and further satisfying both $$10[C]+0.4[Si]+[Mn] \leq 4.5 \quad \text{Formula (1), and}$$

$$0.8 \times (723-10.7[Mn]-16.9[Ni]+29.1[Si]+16.9[Cr])+ \\ 0.2 \times (910-203\sqrt{[C]}+44.7[Si]+31.5[Mo]-30 \\ [Mn]-11[Cr]-20[Cu]+700[P]+400[Al]+400[Ti]) \\ \leq 780 \quad \text{Formula (2)}$$

(where [ ] means content (mass %) for each of chemical composition) and containing, by area ratio, based on the entire microstructure (identical here and hereinafter for the microstructure):
bainitic ferrite: 40 to 65%,
martensite+retained austenite: 15% or more
the martensite: 15% or less, the retained austenite: 5% or more, and
ferrite: 20 to 40%, in which
a C concentration of the retained austenite (CγR) is 0.9 mass % or more,
both of an average grain diameter of recrystallized ferrite and an average grain diameter of sub-grains in un-recrystallized ferrite particles are 3 μm or less and an area ratio of a ferrite having a grain diameter of 5 μm or more is 5% or less and an area ratio of worked ferrite is 5% or less for the ferrite and, further,
an average grain diameter of TiC particles present in the ferrite particles is 10 nm or less.

The invention of claim 2 provides the high strength hot-dip galvanized steel sheet excellent in yield strength and formability according to claim 1, wherein the component composition further contains one or more of:
Cr: 0.01 to 3%,
Mo: 0.01 to 1%,
Cu: 0.01 to 2%,
Ni: 0.01 to 2%,
B: 0.00001 to 0.001%,
Ca: 0.0005 to 0.01%,
Mg: 0.0005 to 0.01%, and
REM: 0.0001 to 0.01%.

The invention of claim 3 provides
a method for manufacturing a high strength hot-dip galvanized steel sheet excellent in yield strength and formability, the method including hot rolling, then cold rolling, and then annealing steel having the component composition shown in Claim 1 or 2 under each of the conditions shown in the followings (1) to (3):

(1) Hot Rolling Condition
After rough rolling, the steel sheet is heated to a hot rolling temperature of 1200° C. or higher, rolled at a finish rolling end temperature of 900° C. or higher, then quenched to a first holding temperature of 550 to 700° C. at an average cooling rate of 10° C./s or higher of a first cooling rate, held at that temperature for a first holding time of 10 to 100 s, and then quenched to a coiling temperature of 400 to 550° C. at an average cooling rate of 10° C./s or more of a second cooling rate, and coiled at that temperature.

(2) Cold Rolling Condition
Cold rolling reduction is 20 to 60%

(3) Annealing Condition
The steel sheet is heated in a temperature region of 500 to 700° C. at an average heating rate of 1 to 10° C./s of a first heating rate, then heated in a temperature region of 700° C. to [0.8 Ac1+0.2 Ac3] at an average heating rate of 8° C./s or higher of a second heating rate, heated from the [0.8 Ac1+0.2 Ac3] to a soaking temperature of {[0.4 Ac1+0.6 Ac3] to [0.2 Ac1+0.8 Ac3]} at an average heating rate of 0.1° C./s or higher of a third heating rate, held at the soaking temperature for a soaking time of 300 s or shorter, then over cooled by quenching from the soaking temperature to a temperature region of 380 to 420° C. at an average cooling rate of 5° C./s or higher of a second cooling rate, dipped in a galvannealing bath, austempered by being held at a quenching stop temperature (over cooling temperature) for an over cooling time of 10 to 60 s, then alloyed by being heated again at an alloying temperature in a temperature region of 480 to 600° C. for an alloying time of 1 to 100 s, and then cooled to an ambient temperature.

Advantageous Effects of Invention

According to the present invention, the TS×EL balance can be ensured by introducing predetermined amounts of ferrite and retained γ as a microstructure of steel sheet, and the TS and YS can be ensured by reducing the mobile dislocations introduced into the ferrite by restricting the introduction amount of martensite for the ferrite, refining and strengthening the microstructure by restricting the introduction amounts of coarse ferrite and worked ferrite to form fine ferrite grain or sub-grain microstructure, and by dispersing fine TiC particles in the ferrite thereby causing precipitation strengthening. As a result, the invention can provide a high strength hot-dip galvanized steel sheet having both excellent tensile strength and yield strength and formability that can be manufactured by austempering within a short time in CGL, as well as a manufacturing method therefor.

DESCRIPTION OF EMBODIMENTS

The present inventors have noted on a TRIP steel sheet containing a bainitic ferrite having a lower microstructure of a high dislocation density (matrix) and a retained austenite (γR) identical with that of the prior art described above and have made various studies on the measure capable of simultaneously ensuring TS of 1,000 MPa or more, YS of 700 MPa or more, and TS×EL of 24000 MPa·% or more as steel sheet properties.

As a result, it has been thought out that the desired steel sheet properties described above can be ensured based on the following thinking and research.

First, the matrix of the steel sheet is based on a bainitic ferrite containing dislocations, to which martensite+retained γ (deformation-induced martensitic transformation in the course of deformation) are partially introduced, thereby ensuring high strength TS of 1000 MPa or more. Further, by introducing the ferrite and the retained γ, EL is increased and TS×EL of 24000 MPa·% or more is ensured. The retained γ which is at a high C concentration and stable, that is, causing deformation-induced martensitic transformation from intermediate to latter period of deformation is introduced to enhance the EL improving effect. Further, for ensuring high YS, the introduction amount of the martensite is restricted to reduce the mobile dislocations introduced into the ferrite accompanied by expansion during martensitic transformation. Further, for strengthening the ferrite thereby preventing preferential yielding, the ferrite is refined and strengthened by forming into fine recrystallized ferrite or un-recrystallized ferrite having fine sub-grains in the particles. In addition, YS of 700 MPa or more is ensured by dispersing fine TiC in the ferrite thereby causing precipitation strengthening. In this case, since the coarse ferrite yields preferentially failing to ensure YS of 700 MPa or more if coarse ferrite particles are introduced by more than a predetermined amount, the area ratio of the coarse ferrite is restricted. Further, since EL is lowered if worked microstructure (worked ferrite) not formed into sub-grain microstructure and recrystallized ferrite particles remain, the introduction amount is restricted.

As a result of further study based on the findings described above, the present inventors have accomplished the present invention.

First, a microstructure characterizing the steel sheet of the present invention is to be described.

[Microstructure of the Steel Sheet of the Present Invention]

As has been described above, the steel sheet of the present invention is based on the microstructure of a TRIP steel in the same manner as that of the prior art described above but is different from the prior art particularly in that the steel sheet contains a predetermined amount of ferrite, contains retained γ at a carbon concentration of 0.9 mass % or higher by 5% or more in terms of an area ratio and, further in that the ferrite is controlled such that both an average circle equivalent diameter of the recrystallized ferrite and an average circle equivalent diameter of the sub-grains in the un-recrystallized ferrite particles are 3 μm or less, the area ratio of the ferrite having an average circle equivalent diameter of 5 μm or more is 5% or less, an area ratio of the worked ferrite is 5% or less and, further, an average circle equivalent diameter of TiC particles present in the ferrite particles is 10 nm or less.

<Bainitic Ferrite: 45 to 65%>

"Bainitic ferrite" in the present invention is apparently different from a bainitic microstructure in that the bainitic microstructure has a lower microstructure having a lath microstructure at high dislocation density and has no carbides in the microstructure and is different also from a polygonal ferrite microstructure having a lower microstructure with no or extremely low dislocation density or a quasi-polygonal ferrite microstructure having a lower microstructure such as fine sub-grains (refer to "Steel Bainite Photographs-1" issued from Japan Iron and Steel Association Fundamental Research Group).

As described above, in the microstructure of the steel sheet according to the present invention, the balance of the strength and the formability can be enhanced based on the bainitic ferrite which is uniformly fine and highly ductile, and has high dislocation density and high strength as a matrix.

In the steel sheet of the present invention, it is necessary that the amount of the bainitic ferrite microstructure is 40 to 65% (preferably 43 to 62% and, more preferably, 45 to 60%) in terms of the area ratio based on the entire microstructure. This is because the effect due to the bainitic ferrite microstructure described above can be provided effectively. The amount of the bainitic ferrite microstructure is determined due to the balance with the retained γ and it is recommended to appropriately control the amount such that the desired properties can be provided.

<Martensite+Retained γ: 15% or More>

For ensuring the strength, martensite is partially introduced into the microstructure. 15% or more (preferably 18% or more and, more preferably, 20% or more) is necessary as the total area ratio of martensite+retained γ based on the entire microstructure.

<Martensite: 15% or Less>

This is defined for decreasing mobile dislocations introduced into the ferrite during formation of the martensite. If the content of the martensite exceeds 15% in terms of the area ratio, the amount of mobile dislocations introduced into ferrite increases excessively failing to ensure YS of 700 MPa or more. Further, if the amount of martensite increases excessively, since the strength increases excessively and the formability can no more be ensured, it is necessary that the content of the martensite is 15% or less (preferably 13% or less, more preferably, 10% or less) in terms of the area ratio based on the entire microstructure.

<Retained γ: 5% or More>

Retained γ is useful for increasing TS×EL by deformation-induced martensitic transformation during deformation and, for providing such an effect effectively, it is necessary that the amount is 5% or more (preferably, 10% or more and, more preferably, 15% or more) in terms of the area ratio based on the entire microstructure.

<Ferrite: 20 to 40%>

Ferrite is a soft phase and the ferrite itself cannot be utilized for increasing the strength, but is effective for enhancing the ductility of the matrix. It is necessary that the content of the ferrite is 20% or more (preferably 22% or more and, more preferably, 25% or more) in terms of the area ratio based on the entire microstructure for ensuring the TS×EL balance. This is controlled within such a range as capable of ensuring the strength of 40% or less (preferably, 38% or less and, more preferably 35% or less) of the area ratio.

<C Concentration of Retained γ (CγR): 0.9 Mass % or More>

CγR is an index that gives an effect on the stability of the retained γ when it transforms into the martensite during working. As the CγR is higher, the retained γ is stabilized more, deformation-induced martensitic transformation occurs in the latter stage of the deformation to enhance the effect of improving TS×EL. For providing such an effect effectively, it is necessary that CγR is 0.9 mass % or more (preferably 0.92 mass % or more and more preferably, 0.95 mass % or more).

<Both Average Particle Diameter of Recrystallized Ferrite and Average Particle Diameter of Sub-Grains in Un-Recrystallized Ferrite Particles: 3 μm or Less>

This is defined for refining and strengthening the soft ferrite that yields preferentially. Different from the worked microstructure, recovered and recrystallized fine ferrite particles and fine sub-grains in the un-recrystallized ferrite particles are effective for improving YS without greatly deteriorating EL. For providing such an effect effectively, it is necessary that the average particle diameter is 3 μm or less both for the recrystallized ferrite and the sub-grains in the un-recrystallized ferrite particles.

<Area Ratio of Ferrite Having a Particle Diameter of 5 μm or More: 5% or Less>

Since coarse ferrite particles are soft since they lack in strengthening and preferentially yield to deteriorate YS, the introduction amount has to be restricted. The area ratio of the ferrite having a particle diameter of 5 μm or more is restricted to 5% or less in order to ensure YS of 700 MPa or more.

<Area Ratio of Worked Ferrite: 5% or Less>

The introduction amount of worked ferrite has to be restricted in order not to deteriorate the effect of improving the ductility of the ferrite. The area ratio of the worked ferrite is controlled to 5% or less in order to ensure TS×EL of 24000 MPa·% or more.

<Average Particle Diameter of TiC Particles Present in the Ferrite Particles: 10 nm or Less>

This is defined for further strengthening the ferrite by precipitation strengthening due to TiC particles in addition to the refinement and strengthening described above. The average particle diameter of the TiC particles is 10 nm or less in order to ensure YS of 700 MPa or more.

[Each of the Methods of Measuring Area Ratio for Each of the Phases, the C Concentration of Retained γ (CγR), and Size of Each Particle]

Each of the methods of measuring the area ratio for each of the phases, the C concentration of the retained γ (CγR), and the size of each of the particles is to be described.

First, for the area ratio of martensite+retained γ, a steel sheet was repeller-corroded, and a region, for example, a white region was defined as "martensite+retained γ" under observation of an optical microscope (factor 1000×) and the area ratio thereof was measured.

Then, the area ratio of the retained γ and the C concentration thereof CγR were measured by X-ray diffractometry after grinding a steel sheet to a ¼ thickness and applying chemical polishing (ISIJ Int. Vol. 33, (1933), No. 7, p. 776).

Then, the area ratio of the martensite was measured as described above. It was determined by subtracting the area ratio of the retained γ from the area ratio of martensite+retained γ.

The area ratio of the bainitic ferrite, the area ratio of the ferrite, the size and the area ratio of the recrystallized ferrite and the sub-grains in the un-recrystallized ferrite particles, and the area ratio of the worked ferrite were determined as described below.

Measurement was performed by using OIM™ manufactured by TSL Co. for a scanning type electron microscope (SEM: JSM-5410, manufactured by JEOL) by an electron beam back scattering diffractometry (EBSD) at 0.2 μm pitch, and the grain boundaries in which the crystallographic direction difference between the BCC phase and the crystal grains adjacent therewith is 5° or more and less than 15° were mapped respectively. In the BCC phase, the region in which the grain boundaries having the directional difference of 15° or more were at 3 or less measuring points, and a region that could not be analyzed were defined as "martensite+worked ferrite" and the area ratio thereof was determined. Then, the area ratio of the worked ferrite was determined by subtracting the area ratio of the martensite determined by the observation under the optical microscope from the above mentioned area ratio. In the remaining BCC phase, regions completely surrounded by grain boundaries having the directional difference of 15° or more were defined as the ferrite particles or the bainitic ferrite particles. Particles having an average KAM value (for example, refer to JP-A No. 2010-255091, paragraphs [0035], [0048]) of 0.5° C. or more were defined as the bainitic ferrite particles, the area ratio thereof was calculated, and the remaining region was defined as the recrystallized ferrite and the size and the area ratio thereof were determined. Further, regions surrounded even partially by the grain boundary having a directional difference of 5° or more or less than 15° were defined as sub-grains, and the size and the area ratio thereof were determined. In this case, for the size of the recrystallized ferrite and the sub-grains, the area for each of the particles converted to an equivalent circle diameter was defined as the particle diameter and the average particle diameter was determined by taking an arithmetic mean for the particle diameters (circle equivalent diameter).

For the size of TiC, TiC particles present in the ferrite particles were determined under observation of a transmission electron microscope (TEM) by a replica method, and the area was converted to a circle equivalent diameter and an arithmetic mean of the circle equivalent diameter was determined as an average particle diameter.

Then, the component composition constituting the steel sheet of the present invention is to be described. Hereinafter, all of the units for the chemical composition are on the mass % base.

[Component Composition of Steel Sheet According to the Present Invention]C: 0.05 to 0.3%

C is an essential element for obtaining a desired principal microstructure (bainitic ferrite+martensite+retained γ) while ensuring a high strength. For effectively providing such an effect, C has to be added by 0.05% or more (preferably, 0.10% or more and, more preferably, 0.15% or more). However, addition by more than 0.3% is not suitable to welding.

Si: 1 to 3%

Si is an element of effectively suppressing the formation of carbides due to decomposition of retained γ. Si is particularly useful also as a solid solution strengthening element. For effectively providing such an effect, Si has to be added by 1% or more. It is preferably 1.1% or more and, more preferably, 1.2% or more. However, if Si is added by more than 3%, since formation of bainitic ferrite+martensitic microstructure is hindered, as well as hot deformation resistance is increased tending to embrittle a weld portion and, further, an undesired effect is given on the surface property of the steel sheet, the upper limit is defined as 3%. It is preferably 2.5% or less and, more preferably, 1.8% or less.

Mn: 1 to 3%

Mn acts effectively as a solid solution strengthening element, as well as also provides an effect of suppressing formation of excess ferrite during cooling till austempering. Further, this is an element necessary for stabilizing γ to obtain desired retained γ. For providing such an effect effectively, it has to be added by 1% or more. This is preferably 1.3% or more and, more preferably, 1.5% or more. However, if Mn is added by more than 3%, formation of the bainitic ferrite+martensitic microstructure is hindered, as well as an undesired effect, for example, formation of crack in cast slabs is observed. It is preferably 2.5% or less and, more preferably, 2% or less.

P: 0.1% or less (inclusive of 0%)

P is present unavoidably as an impurity element but it is an element which may be added for ensuring desired γR. However, if P is added by more than 0.1%, secondary workability is deteriorated. It is more preferably 0.03% or less.

S: 0.01% or less (inclusive of 0%)

S is present unavoidably as an impurity element, forms sulfide inclusions such as MnS, and forms a trigger for cracks to deteriorate the workability. It is preferably 0.008% or less and, more preferably, 0.005% or less.

Ti; 0.02 to 0.2%

Ti is an element which is useful as TiC for ensuring YS of 700 MPa or more by suppressing formation of coarse recrystallized ferrite and precipitation strengthening due to the pinning effect. For providing such an effect effectively, Ti has to be added by 0.02% or more. It is preferably 0.06% or more and, more preferably, 0.08% or more. However, excess addition saturates the effect and is economically wasteful. The upper limit is defined as 0.2%.

Al: 0.001 to 0.1%

Al is added as a deoxidizing agent and it is also an element for effectively suppressing the formation of carbides due to decomposition of retained γ together with Si. For providing such an effect effectively, Al has to be added by 0.001% or more. However, excess addition saturates the effect and is economically wasteful. The upper limit is 0.1%.

N: 0.002 to 0.03%

N is an element present unavoidably and forming precipitates in combination with carbonitride forming elements such as Al and Nb and contributes to the improvement of strength and refinement of the microstructure. For providing such an effect effectively, N has to be incorporated by 0.002% or more. On the other hand, since excess addition of the N content makes casting difficult for the low carbon steel as in the material of the invention, manufacture itself becomes impossible.

$$10[C]+0.4[Si]+[Mn] \leq 4.5 \qquad \text{Formula (1)}$$

This is defined for sufficiently proceeding bainitic transformation by short time austempering in CGL to obtain bainitic ferrite, retained γ, and martensite each in a predetermined percentage. Since each of C, Si, and Mn is an element for delaying bainitic transformation, the balance for the contents of such elements has to be controlled. The formula (1) is formulated by investigating the degree of proceeding of bainitic transformation of steel in which the contents of C, Si, and Mn were changed variously and the percentage of the bainitic ferrite, the retained γ, and the martensite formed in the final microstructure, and experimentally determining the balance components capable of ensuring predetermined structural percentage by short time austempering. If the value on the left side of the formula (1) is more than 4.5, the percentage of the bainitic ferrite and the retained γ is insufficient to deteriorate EL, by which EL is lowered, TS×EL of 24000 MPa·% or more cannot be ensured, or a great amount of mobile dislocations are introduced in ferrite due to excess percentage of the martensite thereby introducing a great amount of mobile dislocations in the ferrite to deteriorate YS. It is preferably 4.4 or less and, more preferably, 4.3 or less.

$$0.8\times(723-10.7[Mn]-16.9[Ni]+29.1[Si]+16.9[Cr])+\\0.2\times(910-203\sqrt{[C]}+44.7[Si]+31.5[Mo]-30\\[Mn]-11[Cr]-20[Cu]+700[P]+400[Al]+400[Ti])\\\leq 780 \quad \text{Formula (2)}$$

This is defined for lowering the temperature at which austenite particles are formed in a 2-phase region by such an amount as capable of suppressing the formation of coarse recrystallized ferrite during temperature elevation in the annealing step. The left side of the formula (2) means "0.8 Ac1+0.2 Ac3" (refer to "The Physical Metallurgy of Steels", p. 273, translated by Koda Shigeyasu, Maruzen Co., LTD. 1985). That is, if the value on the left side of the formula (2) exceeds 780° C., coarse recrystallized ferrite is formed upon temperature elevation in the annealing step failing to ensure YS of 700 MPa or more.

The steel of the present invention basically comprises the components described above with the balance being substantially iron and unavoidable impurities and, in addition, the following allowable components can be added within a range not impairing the effect of the invention.

One or more of:
Cr: 0.01 to 3%,
Mo: 0.01 to 1%,
Cu: 0.01 to 2%.
Ni: 0.01 to 2%, and
B: 0.00001 to 0.01%

The elements are useful as steel strengthening elements and also are elements effective for stabilizing and ensuring a predetermined amount of retained γ. In order to provide such an effect effectively, it is recommended to add
Cr: 0.01% or more (more preferably, 0.05% or more),
Mo: 0.01% or more (more preferably, 0.02% or more),
Cu: 0.01% or more (more preferably, 0.1% or more),
Ni: 0.01% or more (more preferably, 0.1% or more), and
B: 0.0001% or more (more preferably, 0.0002% or more) respectively.
However, the effect described above is saturated even by addition of Cr by more than 3%, Mo by more than 1%, each of Cu and Ni by more than 2%, and B by more than 0.01%, which is economically wasteful. More preferably, Cr is 2.0% or less, Mo is 0.8% or less, Cu is 1.0% or less, Ni is 1.0% or less, and B is 0.0030% or less.

One or more of
Ca: 0.0005 to 0.01%,
Mg: 0.0005 to 0.01%, and
REM: 0.0001 to 0.01%

The elements are those for controlling the configuration of sulfides in the steel and are effective for improving the workability. REM (rare earth metal) used in the invention includes Sc, Y, lanthanoids, etc. For providing the effect effectively, it is recommended to add each of Ca and Mg by 0.0005% or more (more preferably, 0.001% or more) and REM by 0.0001% or more (more preferably, 0.0002% or more (to add). However, the effect described above is saturated with addition of each of Ca and Mg by 0.01% or more and REM by 0.01% or more, which is economically wasteful. More preferably each of Ca and Mg is 0.003% or less and R is 0.006% or less.

Then, a preferred manufacturing method for obtaining steel sheet of the invention is to be described below.
[Preferred Method for Manufacturing Steel Sheet of the Present Invention]

The steel sheet of the present invention is manufactured by hot rolling, then cold rolling, and then annealing steel that satisfies the chemical composition described above in which the condition in each of the steps may be determined based on the following concept for satisfying the requirements of the microstructure.

That is, for obtaining a ferrite microstructure having fine recrystallized ferrite or ferrite microstructure sub-grains in un-recrystallized ferrite, it is necessary to control the configuration of ferrite recovering and recrystallizing from the cold worked microstructure in a cold rolling step, particularly in the temperature elevation process and the soaking process in the annealing step. That is, it is a subject not to remain ferrite as worked by a predetermined amount or more in the final microstructure and suppress the formation of coarse recrystallized ferrite. As a mechanism for forming coarse recrystallized ferrite, it has been known that a sub-grain microstructure is formed by recovery of the worked microstructure, and specified sub-grains are grown into recrystallized ferrite, which is further grown. Accordingly, for decreasing coarse recrystallized ferrite particles, it is effective to suppress coarsening in the stage of sub-grains or fine recrystallized ferrite particles. In the present invention, coarsening of the sub-grains or the fine recrystallized ferrite particles is suppressed by utilizing austenite particles formed in a low temperature 2 phase region by pinning action due to fine TiC particles and optimization of the chemical composition and the temperature elevation pattern in the annealing step. First, TiC is finely precipitated by optimizing an intermediate holding condition in a hot rolling stage and TiC is utilized as pinning particles in the annealing step. The fine TiC particles contribute also as precipitation strengthening particles. In the temperature elevation process in the annealing step, the worked microstructure is recovered and recrystallized in the first temperature elevation process to decrease worked ferrite remaining in the final microstructure. In the second temperature elevation process, temperature is elevated rapidly to a temperature capable of suppressing coarsening of the recrystallized ferrite by a sufficient amount of the austenite particles. In the third temperature elevation process and the soaking process, since coarsening of the recrystallized ferrite can be suppressed by austenite particles in addition to the pinning action of TiC, austenite percentage is controlled.

Based on the concept described above, the steel sheet of the present invention can be manufactured specifically by subjecting the steel sheet that satisfies the component composition described above to hot rolling, then cold rolling and, subsequently, annealing, under each of the conditions shown in the followings (1) to (3).

(1) Hot Rolling Condition

After rough rolling, the steel sheet is heated to a hot rolling heating temperature of 1200° C. or higher, rolled at a finish rolling end temperature of 900° C. or higher, then quenched to a first holding temperature of 550 to 700° C. at an average cooling rate of 10° C./s or higher of a first cooling rate, held at the temperature for a first holding time of 10 to 100 s, then quenched to a coiling temperature of 400 to 550° C. at an average cooling rate of 10° C./s or higher of a second cooling rate, and coiled at that temperature.

<Hot Rolling Heating Temperature: 1200° C. or Higher>

This is defined for completely solid solubilizing Ti into steel thereby precipitating TiC in a matrix and sufficiently obtaining the effect of pinning and precipitation strengthening by TiC particles. For reliably providing such an effect, the hot rolling heating temperature is set to 1200° C. or higher.

<Finish Rolling End Temperature: 900° C. or Higher>

This is defined for recrystallizing austenite after the completion of finish rolling, thereby preventing precipitation of coarse TiC in a high temperature region. If the temperature is lower than 900° C., un-recrystallized austenite microstructure is formed, coarse TiC precipitates on dislocations in a high temperature region of a succeeding cooling process, so that no sufficient effect of pinning and precipitation strengthening of TiC can be obtained, so that YS can no more be ensured.

<First Cooling Rate: Steel Sheet is Quenched to a First Holding Temperature of 550 to 700° C. at an Average Cooling Rate of 10° C./s or Higher>

This is defined for preventing precipitation of coarse TiC in the high temperature region. If the first cooling rate is lower than 10° C./s, or the first holding temperature exceeds 700° C., coarse TiC precipitates on the austenite grain boundary, so that no sufficient pinning and precipitation strengthening effect of TiC can be obtained and YS can no more be ensured.

<First Holding Temperature: Steel Sheet is Held at 550 to 700° C. for First Holding Time of 10 to 100 s>

This is defined for causing ferritic transformation to precipitate fine TiC particles at the boundary between austenite and ferrite. If the first holding temperature is lower than 550° C. or the first holding time is less than 10 s, TiC does not precipitate in a sufficient amount and, on the other hand, if the first holding time exceeds 100 s, TiC becomes coarser. In any of the cases, no sufficient effect of TiC for pinning and precipitation strengthening of TiC can be obtained and YS can no more be ensured.

<Second Cooling Rate: The Steel Sheet is Quenched to a Coiling Temperature of 400 to 550° C. at an Average Cooling Rate of 10° C./s or Higher and then Coiled at that Temperature>

This is defined not for coarsening precipitated fine TiC particles. If the cooling temperature is lower than 400° C., the steel is excessively strengthened and making the cold rolling difficult.

(2) Cold Rolling Condition

Cold rolling reduction: 20 to 60%

This is defined for forming fine recrystallized ferrite particles and sub-grains in the un-recrystallized ferrite particles in the temperature elevation process of the next annealing step. If the cold rolling reduction is less than 20%, the worked microstructure does not sufficiently recover and recrystallize in the temperature elevation process but the worked ferrite remains in the final microstructure, so that EL is lowered and TS×EL can no more be ensured. On the other hand, if the cold rolling reduction exceeds 60%, coarsening of recrystallized particles is promoted in the temperature elevation process, and the fine recrystallized ferrite particles and sub-grains in the un-recrystallized particles cannot be obtained, so that YS can no more be ensured.

(3) Annealing Condition

The steel sheets is heated in a temperature region of 500 to 700° C. at an average heating rate of 1 to 10° C./s of a first heating rate, then heated in a temperature region of 700° C. to [0.8 Ac1+0.2 Ac3] at an average heating rate of 8° C./s or higher of second heating rate, heated from the [0.8 Ac1+0.2 Ac3] to the soaking temperature of {[0.4 Ac1+0.6 Ac3] to [0.2 Ac1+0.8 Ac3]} at an average heating rate of 0.1° C./s or higher of a third heating rate, held at the soaking temperature for a soaking time of 300 s or less, then over cooled by quenching from the soaking temperature to a temperature region of 380 to 420° C. at an average cooling rate of 5° C./s or higher of a second cooling rate, dipped in a galvannealing bath, austempered by being held at a quenching stop temperature (over cooling temperature) for an over cooling time of 10 to 60 s, then alloyed by re-heating in a temperature region of an alloying temperature of 480 to 600° C. for an alloying time of 1 to 100 s, and then cooled to an ambient temperature.

<Temperature Elevation in a Temperature Region of 500 to 700° C. at an Average Heating Rate of 1 to 10° C./s of a First Heating Rate>

This is defined for forming fine recrystallized ferrite particles and sub-grains in the un-recrystallized ferrite particles. If the first heating rate is lower than 1° C./s, coarse recrystallized ferrite is formed and YS can no more be ensured. On the other hand, if the first heating rate exceeds 10° C./s, worked ferrite remains in the final microstructure to lower EL, and TS×EL can no more be ensured.

<Temperature Elevation in a Temperature Region of 700° C. to [0.8 Ac1+0.2 Ac3] at Average Heating Rate of 8° C./s or Higher of a Second Heating rate>

This is defined for rapidly heating the steel sheet in a temperature region at which coarse recrystallized ferrite is formed to reach the 2 phase region temperature capable of obtaining austenite particles in an amount sufficient to suppress the formation of coarse recrystallized ferrite in a short time. If the second heating rate is lower than 8° C./s, a great amount of coarse recrystallized ferrite is formed and YS can no more be ensured. [0.8 Ac1+0.2 Ac3] can be calculated according to the formula on the left side of the formula (2) as described above.

<Temperature Elevation from [0.8 Ac1+0.2 Ac3] to Soaking Temperature from {[0.4 Ac1+0.6 Ac3] to [0.2 Ac1+0.8 Ac3]} at an Average Heating Rate of 0.1° C./s or Higher of a Third Heating Rate>

Since the formation of coarse recrystallized ferrite is suppressed by fine TiC particles and austenite particles formed under the manufacturing conditions up to the preceding stage described above, it may suffice in this stage to heat the steel sheet to such a soaking temperature as capable of obtaining a predetermined austenite percentage at a predetermined heating rate. If the soaking temperature is lower than [0.4 Ac1+0.6 Ac3], since the ferrite percentage is excessively high and the percentage of the bainitic ferrite and retained γ+martensite contained in the final microstructure is lowered, TS can no more be ensured. On the other hand, if the soaking temperature is [0.2 Ac1+0.8 Ac3] or lower, the ferrite percentage is excessively lower to lower EL and TS×EL can no more be ensured. Further, if the third heating rate is lower than 0.1° C./s, coarse recrystallized ferrite is formed due to coarsening of TiC particles and austenite particles and YS can no more be ensured. The upper and lower limit values for the range of the soaking temperature [0.4 Ac1+0.6 Ac3] and [0.2 Ac1+0.8 Ac3] can be calculated by changing coefficients "0.8 and 0.2" into "0.4 and 0.6" and "0.2 and 0.8" respectively on the left of the formula (2).

<Soaking Time: Holding for 300 s or Less>

If a soaking time exceeds 300 s, coarse recrystallized ferrite is formed due to coarsening of TiC particles and austenite particles and YS can no more be ensured.

<Quenching from Soaking Temperature at an Average Cooling Rate of 5° C./s or Higher of a Second Cooling Rate>

This is defined for suppressing formation of ferrite during cooling. If the second cooling rate is lower than 5° C./s, the ferrite percentage is excessively high and TS can no more be ensured.

<Quenching Stop Temperature (Over Cooling Temperature): Steel Sheet is Over Cooled by Quenching to a Temperature Region of 380 to 420° C. and Dipped in Galvannealing Bath>

This is defined for proceeding bainitic transformation sufficiently even in a short time austempering by CGL by applying austempering at an optimal temperature, optimizing the percentages of the bainitic ferrite, retained γ, and martensite, and sufficiently increasing the C concentration in the retained γ. If the quenching stop temperature (over cooling temperature) is lower than 380° C., bainitic transformation does not proceed sufficiently in a short time to lower the percentages of the bainitic ferrite and retained γ and, on the other hand, the martensite percentage is excessively high, and both TS×EL and YS can no more be ensured. On the other hand, if the quenching step temperature (over cooling temperature) exceeds 420° C., the C concentration in the retained γ is excessively low and TS×EL can no more be ensured. There is no restriction for the galvannealing bath.

<Austempering Treatment by Holding the Steel Sheet at the Quenching Stop Temperature (Over Cooling Temperature) for the Over Cooling Time of 10 to 60 s>

This is defined for promoting proceeding of bainitic transformation and ensuring productivity in CGL. If the over cooling time is less than 10 s, bainitic transformation does not proceed sufficiently in a short time to lower the percentages of bainitic ferrite and retained γ and, on the other hand, the percentage of martensite is excessively high, so that both TS×EL and YS can no more be ensured. On the other hand, if the over cooling time exceeds 60 s, the productivity of CGL is deteriorated.

<Alloying Temperature: The Steel Sheet is Alloyed by Reheating in a Temperature Region of 480 to 600° C. for an Alloying Time of 1 to 100 s and then Cooled to an Ambient Temperature>

This is defined for alloying a plated portion while suppressing decomposition of austenite. If the alloying temperature is higher than 600° C. or the alloying time is higher than 100 s, since cementite precipitates from austenite at high C concentration prepared in the austempering step, a predetermined amount of retained γ cannot be ensured in the final microstructure, and TS×EL can no more be ensured. On the other hand, if the alloying temperature is lower than 480° C. or the alloying time is less than 1 s, plated portion is no more alloyed.

EXAMPLE

A test steel comprising each of component compositions shown in Table 1 was melted under vacuum to form a slab of 30 mm thickness, then the slab was heated to a hot rolling heating temperature T1(° C.), hot rolled to a thickness of 2.5 mm at a finish rolling end temperature T2(° C.), then quenched to the first holding temperature T3(° C.) at an average cooling rate CR1(° C./s) of a first cooling rate, held at that temperature for a first holding time t1(s), then quenched to a coiling temperature T4(° C.) at an average cooling rate CR2(° C./s) of a second cooling rate, placed at a coiling temperature T4(° C.) and air cooled in a holding furnace for 30 minutes to simulate coiling of the hot rolled steel sheet. Subsequently, the sheet was cold rolled at a cold rolling reduction r of 52% into a cold rolled sheet of 1.2 mm thickness. The steel of heat treatment No. 12 was ground for the surface and the rear face into 1.4 mm thickness before cold rolling and cold rolled at a cold rolling reduction r of 15% into a cold rolled sheet of 1.2 mm thickness. Further, the steel of heat treatment No. 13, was hot rolled to a thickness of 4.0 mm, cold rolled at a cold rolling reduction r of 70% into a cold rolled sheet of 1.2 mm thickness. Then, such cold rolled sheets were applied with heat treatment by the following procedures under various annealing conditions shown in Tables 2 and 3.

That is, the cold rolled sheet was heated in a temperature region of 500 to 700° C. at an average heating rate HR1(° C./s) of a first heating rate, then heated in a temperature region from 700° C. to [value on the left of the formula (2) (unit: ° C.)] at an average heating rate HR2(° C./s) of a second heating rate, heated from the value on the left side of the formula (2) (unit: ° C.) to a soaking temperature T1(° C.) at an average heating rate HR3(° C./s) of a third heating rate, held at the soaking temperature T1(° C.) for a soaking time of t1(s), then over cooled by quenching from the soaking temperature T1 to a quenching stop temperature (over cooling temperature) T2(° C.) at an average cooling rate CR2(° C./s) of a second cooling rate, dipped in a galvannealing bath, austempered by being held at the quenching stop temperature (over cooling temperature) T2(° C.) for an over cooling time t2(s), then alloyed by being heated again in a temperature region of an alloying temperature T3(° C.) for an alloying time t3(s), and then cooled to an ambient temperature.

For the steel sheets obtained as described above, each of the measuring methods for the area ratio of each phase, the C concentration of retained γ (CγR), and the size for each of the particles were measured by the measuring method described in the paragraph of the [Description of Embodiments].

Further, for evaluating mechanical properties of the steel sheets described above, a cold tensile test was performed (performed at a tensile speed of 10 mm/min by using a JIS No. 5 test specimen) to measure the yield strength (YS), the tensile strength (TS), and the elongation [total elongation (EL)].

The results are shown in Tables 4 and 5.

TABLE 1

| Steel grade symbol | Component (mass %, balance comprising Fe and unavoidable impurities) | | | | | | | | | Value on the left side of formula (1) | Value on the left side of formula (2) | Transformation temperature (° C.) | | | |
|---|---|---|---|---|---|---|---|---|---|---|---|---|---|---|---|
| | C | Si | Mn | P | S | Ti | Al | N | Others | | | Ac1 | Ac3 | 0.4Ac1 + 0.6Ac3 | 0.2Ac1 + 0.8Ac3 |
| A | 0.18 | 1.50 | 1.70 | 0.01 | 0.001 | 0.08 | 0.040 | 0.0040 | — | 4.10 | 778 | 748 | 895 | 836 | 866 |
| B | 0.18 | 1.50 | 1.70 | 0.01 | 0.001 | 0.08 | 0.040 | 0.0040 | Ca: 0.001 | 4.10 | 778 | 748 | 895 | 836 | 866 |
| C | 0.18 | 1.50 | 1.70 | 0.01 | 0.001 | 0.08 | 0.040 | 0.0040 | Mg: 0.001 | 4.10 | 778 | 748 | 895 | 836 | 866 |
| <u>D</u> | <u>0.03</u> | 1.50 | 1.70 | 0.01 | 0.001 | 0.08 | 0.040 | 0.0040 | Ca: 0.001 | 2.60 | <u>788</u> | 748 | 946 | 867 | 906 |
| E | 0.12 | 1.50 | 2.20 | 0.01 | 0.001 | 0.08 | 0.040 | 0.0040 | Ca: 0.001 | 4.00 | 774 | 743 | 896 | 835 | 888 |
| F | 0.23 | 1.20 | 1.60 | 0.01 | 0.001 | 0.08 | 0.040 | 0.0040 | Ca: 0.001 | 4.38 | 767 | 741 | 873 | 820 | 867 |
| <u>G</u> | <u>0.35</u> | 1.20 | 1.60 | 0.01 | 0.001 | 0.08 | 0.040 | 0.0040 | Ca: 0.001 | <u>5.58</u> | 763 | 741 | 851 | 807 | 845 |
| <u>H</u> | 0.18 | <u>0.30</u> | 1.70 | 0.01 | 0.001 | 0.08 | 0.040 | 0.0040 | Ca: 0.001 | 3.62 | 739 | 714 | 841 | 790 | 835 |
| I | 0.20 | 1.05 | 1.80 | 0.01 | 0.001 | 0.08 | 0.040 | 0.0040 | Ca: 0.001 | 4.22 | 761 | 734 | 867 | 814 | 861 |
| J | 0.09 | 1.80 | 2.70 | 0.01 | 0.001 | 0.08 | 0.040 | 0.0040 | Ca: 0.001 | 4.32 | 778 | 746 | 904 | 841 | 896 |
| <u>K</u> | 0.18 | <u>3.20</u> | 1.70 | 0.01 | 0.001 | 0.08 | 0.040 | 0.0040 | Ca: 0.001 | <u>4.78</u> | <u>833</u> | 798 | 971 | 902 | 962 |
| <u>L</u> | 0.18 | 1.50 | <u>0.80</u> | 0.01 | 0.001 | 0.08 | 0.040 | 0.0040 | Ca: 0.001 | 3.20 | 791 | 758 | 922 | 856 | 914 |
| M | 0.20 | 1.40 | 1.40 | 0.01 | 0.001 | 0.08 | 0.040 | 0.0040 | Ca: 0.001 | 3.96 | 778 | 749 | 895 | 836 | 887 |
| N | 0.14 | 1.50 | 2.20 | 0.01 | 0.001 | 0.08 | 0.040 | 0.0040 | Ca: 0.001 | 4.20 | 773 | 743 | 890 | 831 | 883 |
| O | 0.12 | 1.20 | 2.60 | 0.01 | 0.001 | 0.08 | 0.040 | 0.0040 | Ca: 0.001 | 4.28 | 758 | 730 | 870 | 814 | 863 |
| <u>P</u> | 0.18 | 1.50 | <u>3.20</u> | 0.01 | 0.001 | 0.08 | 0.040 | 0.0040 | Ca: 0.001 | <u>5.60</u> | 756 | 732 | 850 | 803 | 844 |
| <u>Q</u> | 0.18 | 1.50 | 1.70 | 0.01 | 0.001 | <u>0.01</u> | 0.040 | 0.0040 | Ca: 0.001 | 4.10 | 772 | 748 | 867 | 820 | 861 |
| R | 0.18 | 1.50 | 1.70 | 0.01 | 0.001 | 0.05 | 0.040 | 0.0040 | Ca: 0.001 | 4.10 | 775 | 748 | 883 | 829 | 856 |
| <u>S</u> | 0.18 | 1.50 | 1.70 | 0.01 | 0.001 | <u>0.14</u> | 0.040 | 0.0040 | Ca: 0.001 | 4.10 | <u>783</u> | 748 | 919 | 851 | 910 |
| T | 0.18 | 1.50 | 1.70 | 0.01 | 0.001 | 0.08 | 0.040 | 0.0040 | Cr: 0.15, Ca: 0.001 | 4.10 | 779 | 751 | 893 | 836 | 865 |
| U | 0.18 | 1.50 | 1.70 | 0.01 | 0.001 | 0.08 | 0.040 | 0.0040 | Mo: 0.2, Ca: 0.001 | 4.10 | 779 | 748 | 901 | 840 | 871 |
| V | 0.18 | 1.50 | 1.70 | 0.01 | 0.001 | 0.08 | 0.040 | 0.0040 | Cu: 0.5, Ca: 0.001 | 4.10 | 776 | 748 | 885 | 830 | 858 |
| W | 0.18 | 1.50 | 1.70 | 0.01 | 0.001 | 0.08 | 0.040 | 0.0040 | Ni: 0.4, Ca: 0.001 | 4.10 | 772 | 742 | 895 | 834 | 864 |
| X | 0.18 | 1.50 | 1.60 | 0.01 | 0.001 | 0.08 | 0.040 | 0.0040 | B: 0.0005, Ca: 0.001 | 4.00 | 774 | 743 | 898 | 836 | 867 |
| Y | 0.18 | 1.50 | 1.70 | 0.01 | 0.001 | 0.08 | 0.040 | 0.0040 | REM: 0.001 | 4.10 | 778 | 748 | 895 | 836 | 866 |

(—: No addition, underlined: Out of the range of the invention)

TABLE 2

| Heat treatment No. | Steel grade symbol | Hot rolling | | | | | | | Cold Rolling |
|---|---|---|---|---|---|---|---|---|---|
| | | Heating temperature T1 (° C.) | Finish temperature T2 (° C.) | First cooling rate CR1 (° C./s) | First holding temperature T3 (° C.) | First holding time t1 (s) | Second cooling rate CR2 (° C./s) | Coiling temperature T4 (° C.) | Cold Rolling reduction r (%) |
| 1 | A | 1250 | 920 | 30 | 650 | 20 | 20 | 500 | 52 |
| 2 | B | 1250 | 920 | 30 | 650 | 20 | 20 | 500 | 52 |
| <u>3</u> | B | <u>1100</u> | 920 | 30 | 650 | 20 | 20 | 500 | 52 |
| <u>4</u> | B | 1250 | <u>820</u> | 30 | 650 | 20 | 20 | 500 | 52 |
| <u>5</u> | B | 1250 | 920 | <u>5</u> | 650 | 20 | 20 | 500 | 52 |
| <u>6</u> | B | 1250 | 920 | 30 | <u>720</u> | 20 | 20 | 500 | 52 |
| <u>7</u> | B | 1250 | 920 | 30 | <u>520</u> | 20 | 20 | 400 | 52 |
| <u>8</u> | B | 1250 | 920 | 30 | 650 | <u>5</u> | 20 | 500 | 52 |
| <u>9</u> | B | 1250 | 920 | 30 | 650 | <u>200</u> | 20 | 500 | 52 |
| <u>10</u> | B | 1250 | 920 | 30 | 650 | 20 | <u>3</u> | 500 | 52 |
| <u>11</u> | B | 1250 | 920 | 30 | 650 | 20 | 20 | <u>600</u> | 52 |
| <u>12</u> | B | 1250 | 920 | 30 | 650 | 20 | 20 | 500 | <u>15</u> |
| <u>13</u> | B | 1293 | 920 | 30 | 650 | 20 | 20 | 500 | <u>70</u> |
| <u>14</u> | B | 1250 | 920 | 30 | 650 | 20 | 20 | 500 | <u>52</u> |
| <u>15</u> | B | 1250 | 920 | 30 | 650 | 20 | 20 | 500 | 52 |
| <u>16</u> | B | 1250 | 920 | 30 | 650 | 20 | 20 | 500 | 52 |
| <u>17</u> | B | 1250 | 920 | 30 | 650 | 20 | 20 | 500 | 52 |
| <u>18</u> | B | 1250 | 920 | 30 | 650 | 20 | 20 | 500 | 52 |
| <u>19</u> | B | 1250 | 920 | 30 | 650 | 20 | 20 | 500 | 52 |
| <u>20</u> | B | 1250 | 920 | 30 | 650 | 20 | 20 | 500 | 52 |
| <u>21</u> | B | 1250 | 920 | 30 | 650 | 20 | 20 | 500 | 52 |
| <u>22</u> | B | 1250 | 920 | 30 | 650 | 20 | 20 | 500 | 52 |
| <u>23</u> | B | 1250 | 920 | 30 | 650 | 20 | 20 | 500 | 52 |
| <u>24</u> | B | 1250 | 920 | 30 | 650 | 20 | 20 | 500 | 52 |

| Heat treatment No. | Annealing | | | | | | | | | |
|---|---|---|---|---|---|---|---|---|---|---|
| | First heating rate HR1 (° C./s) | Second heating rate HR2 (° C./s) | Third heating rate HR3 (° C./s) | Soaking temperature T5 (° C.) | Soaking time t2 (s) | Third cooling rate CR3 (° C./s) | Over cooling temperature T6 (° C.) | Over cooling time t3 (s) | Alloying temperature T7 (° C.) | Alloying time t4 (s) |
| 1 | 5.0 | 12.0 | 1.0 | 850 | 50 | 20 | 410 | 45 | 510 | 10 |
| 2 | 5.0 | 12.0 | 1.0 | 850 | 50 | 20 | 410 | 45 | 510 | 10 |

TABLE 2-continued

| | | | | | | | | | | |
|---|---|---|---|---|---|---|---|---|---|---|
| 3 | 5.0 | 12.0 | 1.0 | 850 | 50 | 20 | 410 | 45 | 510 | 10 |
| 4 | 5.0 | 12.0 | 1.0 | 850 | 50 | 20 | 410 | 45 | 510 | 10 |
| 5 | 5.0 | 12.0 | 1.0 | 850 | 50 | 20 | 410 | 45 | 510 | 10 |
| 6 | 5.0 | 12.0 | 1.0 | 850 | 50 | 20 | 410 | 45 | 510 | 10 |
| 7 | 5.0 | 12.0 | 1.0 | 850 | 50 | 20 | 410 | 45 | 510 | 10 |
| 8 | 5.0 | 12.0 | 1.0 | 850 | 50 | 20 | 410 | 45 | 510 | 10 |
| 9 | 5.0 | 12.0 | 1.0 | 850 | 50 | 20 | 410 | 45 | 510 | 10 |
| 10 | 5.0 | 12.0 | 1.0 | 850 | 50 | 20 | 410 | 45 | 510 | 10 |
| 11 | 5.0 | 12.0 | 1.0 | 850 | 50 | 20 | 410 | 45 | 510 | 10 |
| 12 | 5.0 | 12.0 | 1.0 | 850 | 50 | 20 | 410 | 45 | 510 | 10 |
| 13 | 5.0 | 12.0 | 1.0 | 850 | 50 | 20 | 410 | 45 | 510 | 10 |
| 14 | <u>12.0</u> | 12.0 | 1.0 | 850 | 50 | 20 | 410 | 45 | 510 | 10 |
| 15 | 5.0 | <u>5.0</u> | 1.0 | 850 | 50 | 20 | 410 | 45 | 510 | 10 |
| 16 | 5.0 | 12.0 | 1.0 | <u>800</u> | 50 | 20 | 410 | 45 | 510 | 10 |
| 17 | 5.0 | 12.0 | 1.0 | <u>900</u> | 50 | 20 | 410 | 45 | 510 | 10 |
| 18 | 5.0 | 12.0 | 1.0 | 850 | <u>600</u> | 20 | 410 | 45 | 510 | 10 |
| 19 | 5.0 | 12.0 | 1.0 | 850 | 50 | <u>3</u> | 410 | 45 | 510 | 10 |
| 20 | 5.0 | 12.0 | 1.0 | 850 | 50 | 20 | <u>340</u> | 45 | 510 | 10 |
| 21 | 5.0 | 12.0 | 1.0 | 850 | 50 | 20 | <u>470</u> | 45 | 510 | 10 |
| 22 | 5.0 | 12.0 | 1.0 | 850 | 50 | 20 | 410 | <u>5</u> | 510 | 10 |
| 23 | 5.0 | 12.0 | 1.0 | 850 | 50 | 20 | 410 | 45 | <u>610</u> | 10 |
| 24 | 5.0 | 12.0 | 1.0 | 850 | 50 | 20 | 410 | 45 | 510 | <u>150</u> |

(underlined: Out of the range of the invention)

TABLE 3

(Continued from Table 2)

| | | Hot rolling | | | | | | | Cold Rolling |
|---|---|---|---|---|---|---|---|---|---|
| Heat treatment No. | Steel grade symbol | Heating temperature T1 (° C.) | Finish temperature T2 (° C.) | First cooling rate CR1 (° C./s) | First holding temperature T3 (° C.) | First holding time t1 (s) | Second cooling rate CR2 (° C./s) | Coiling temperature T4 (° C.) | Cold Rolling reduction r (%) |
| 25 | C | 1250 | 920 | 30 | 650 | 20 | 20 | 500 | 52 |
| 26 | <u>D</u> | 1250 | 920 | 30 | 650 | 20 | 20 | 500 | 52 |
| 27 | <u>E</u> | 1250 | 920 | 30 | 650 | 20 | 20 | 500 | 52 |
| 28 | F | 1250 | 920 | 30 | 650 | 20 | 20 | 500 | 52 |
| 29 | <u>G</u> | 1250 | 920 | 30 | 650 | 20 | 20 | 500 | 52 |
| 30 | <u>H</u> | 1250 | 920 | 30 | 650 | 20 | 20 | 500 | 52 |
| 31 | I | 1250 | 920 | 30 | 650 | 20 | 20 | 500 | 52 |
| 32 | J | 1250 | 920 | 30 | 650 | 20 | 20 | 500 | 52 |
| 33 | <u>K</u> | 1250 | 920 | 30 | 650 | 20 | 20 | 500 | 52 |
| 34 | <u>L</u> | 1250 | 920 | 30 | 650 | 20 | 20 | 500 | 52 |
| 35 | M | 1250 | 920 | 30 | 650 | 20 | 20 | 500 | 52 |
| 36 | N | 1250 | 920 | 30 | 650 | 20 | 20 | 500 | 52 |
| 37 | O | 1250 | 920 | 30 | 650 | 20 | 20 | 500 | 52 |
| 38 | <u>P</u> | 1250 | 920 | 30 | 650 | 20 | 20 | 500 | 52 |
| 39 | <u>Q</u> | 1250 | 920 | 30 | 650 | 20 | 20 | 500 | 52 |
| 40 | R | 1250 | 920 | 30 | 650 | 20 | 20 | 500 | 52 |
| 41 | <u>S</u> | 1250 | 920 | 30 | 650 | 20 | 20 | 500 | 52 |
| 42 | T | 1250 | 920 | 30 | 650 | 20 | 20 | 500 | 52 |
| 43 | U | 1250 | 920 | 30 | 650 | 20 | 20 | 500 | 52 |
| 44 | V | 1250 | 920 | 30 | 650 | 20 | 20 | 500 | 52 |
| 45 | W | 1250 | 920 | 30 | 650 | 20 | 20 | 500 | 52 |
| 46 | X | 1250 | 920 | 30 | 650 | 20 | 20 | 500 | 52 |
| 47 | Y | 1250 | 920 | 30 | 650 | 20 | 20 | 500 | 52 |

| | Annealing | | | | | | | | | |
|---|---|---|---|---|---|---|---|---|---|---|
| Heat treatment No. | First heating rate HR1 (° C./s) | Second heating rate HR2 (° C./s) | Third heating rate HR3 (° C./s) | Soaking temperature T5 (° C.) | Soaking time t2 (s) | Third cooling rate CR3 (° C./s) | Over cooling temperature T6 (° C.) | Over cooling time t3 (s) | Alloying temperature T7 (° C.) | Alloying time t4 (s) |
| 25 | 5.0 | 12.0 | 1.0 | 850 | 50 | 20 | 410 | 45 | 510 | 10 |
| 26 | 5.0 | 12.0 | 1.0 | 880 | 50 | 20 | 410 | 45 | 510 | 10 |
| 27 | 5.0 | 12.0 | 1.0 | 850 | 50 | 20 | 410 | 45 | 510 | 10 |
| 28 | 5.0 | 12.0 | 1.0 | 840 | 50 | 20 | 410 | 45 | 510 | 10 |
| 29 | 5.0 | 12.0 | 1.0 | 820 | 50 | 20 | 410 | 45 | 510 | 10 |
| 30 | 5 0 | 12.0 | 1.0 | 810 | 50 | 20 | 410 | 45 | 510 | 10 |
| 31 | 5.0 | 12.0 | 1.0 | 840 | 50 | 20 | 410 | 60 | 510 | 10 |
| 32 | 5.0 | 12.0 | 1.0 | 870 | 50 | 20 | 410 | 60 | 510 | 10 |
| 33 | 5.0 | 12.0 | 1.0 | 920 | 50 | 20 | 410 | 45 | 510 | 10 |
| 34 | 5.0 | 12.0 | 1.0 | 880 | 50 | 20 | 410 | 45 | 510 | 10 |
| 35 | 5.0 | 12.0 | 1.0 | 860 | 50 | 20 | 410 | 45 | 510 | 10 |
| 36 | 5.0 | 12.0 | 1.0 | 860 | 50 | 20 | 410 | 60 | 510 | 10 |

TABLE 3-continued (Continued from Table 2)

| | | | | | | | | | | |
|---|---|---|---|---|---|---|---|---|---|---|
| 37 | 5.0 | 12.0 | 1.0 | 840 | 50 | 20 | 410 | 60 | 510 | 10 |
| 38 | 5.0 | 12.0 | 1.0 | 820 | 50 | 20 | 410 | 45 | 510 | 10 |
| 39 | 5.0 | 12.0 | 1.0 | 840 | 50 | 20 | 410 | 45 | 510 | 10 |
| 40 | 5.0 | 12.0 | 1.0 | 840 | 50 | 20 | 410 | 45 | 510 | 10 |
| 41 | 5 0 | 12.0 | 1.0 | 870 | 50 | 20 | 410 | 45 | 510 | 10 |
| 42 | 5.0 | 12.0 | 1.0 | 850 | 50 | 20 | 410 | 45 | 510 | 10 |
| 43 | 5.0 | 12.0 | 1.0 | 860 | 50 | 20 | 410 | 45 | 510 | 10 |
| 44 | 5.0 | 12.0 | 1.0 | 850 | 50 | 20 | 410 | 45 | 510 | 10 |
| 45 | 5.0 | 12.0 | 1 0 | 850 | 50 | 20 | 410 | 45 | 510 | 10 |
| 46 | 5.0 | 12.0 | 1.0 | 850 | 50 | 20 | 410 | 45 | 510 | 10 |
| 47 | 5 0 | 12.0 | 1.0 | 850 | 50 | 20 | 410 | 45 | 510 | 10 |

(underlined: Out of the range of the invention)

TABLE 4

| | | | Microstructure | | | | | | | | | | | |
|---|---|---|---|---|---|---|---|---|---|---|---|---|---|---|
| | | | Area ratio (%) | | | | | Average particle diameter of recrystallized α and SG (μm) | Average particle diameter of TiC in α (μm) | | Mechanical property | | | |
| Steel No. | Steel grade symbol | Heat treatment No. | BF | M + γR | γR | M | α | α having particle diameter of 5 μm or more in α | Worked α in α | | | CγR (wt %) | YS (MPa) | TS (MPa) | EL (%) | TS × EL (MPa · %) | Evaluation |

| Steel No. | Steel grade symbol | Heat treatment No. | BF | M + γR | γR | M | α | α having 5μm+ | Worked α | Avg recrys α/SG (μm) | Avg TiC (μm) | CγR (wt%) | YS (MPa) | TS (MPa) | EL (%) | TS×EL | Eval |
|---|---|---|---|---|---|---|---|---|---|---|---|---|---|---|---|---|---|
| 1 | A | 1 | 47 | 22 | 13 | 9 | 31 | 3 | 3 | 2.0 | 7.0 | 0.95 | 720 | 1010 | 24 | 24240 | ○ |
| 2 | B | 2 | 48 | 22 | 14 | 8 | 30 | 3 | 3 | 2.0 | 7.0 | 0.94 | 730 | 1025 | 24 | 24600 | ○ |
| 3 | B | <u>3</u> | 46 | 25 | 14 | 11 | 29 | <u>14</u> | 0 | <u>8.0</u> | <u>20.0</u> | 0.93 | <u>520</u> | 1000 | 25 | 25000 | X |
| 4 | B | <u>4</u> | 48 | 25 | 14 | 11 | 27 | <u>13</u> | 0 | <u>7.0</u> | <u>15.0</u> | 0.93 | <u>560</u> | 1020 | 24 | 24480 | X |
| 5 | B | <u>5</u> | 47 | 24 | 14 | 10 | 29 | <u>13</u> | 0 | <u>7.0</u> | <u>14.0</u> | 0.92 | <u>570</u> | 1030 | 24 | 24720 | X |
| 6 | B | <u>6</u> | 46 | 25 | 14 | 11 | 29 | <u>12</u> | 0 | <u>7.0</u> | <u>13.0</u> | 0.93 | <u>580</u> | 1030 | 24 | 24720 | X |
| 7 | B | <u>7</u> | 48 | 24 | 14 | 10 | 28 | <u>13</u> | 0 | <u>7.0</u> | <u>11.0</u> | 0.92 | <u>590</u> | 1040 | 24 | 24960 | X |
| 8 | B | <u>8</u> | 46 | 25 | 14 | 11 | 29 | <u>12</u> | 0 | <u>7.0</u> | <u>11.0</u> | 0.93 | <u>590</u> | 1030 | 24 | 24720 | X |
| 9 | B | <u>9</u> | 46 | 24 | 14 | 10 | 30 | <u>13</u> | 0 | <u>70</u> | <u>13.0</u> | 0.94 | <u>580</u> | 1020 | 24 | 24480 | X |
| 10 | B | <u>10</u> | 47 | 24 | 14 | 10 | 29 | <u>12</u> | 0 | <u>7.0</u> | <u>13.0</u> | 0.93 | <u>580</u> | 1030 | 24 | 24720 | X |
| 11 | B | <u>11</u> | 48 | 23 | 14 | 9 | 29 | <u>13</u> | 0 | <u>7.0</u> | <u>12.0</u> | 0.93 | <u>590</u> | 1030 | 24 | 24720 | X |
| 12 | B | <u>12</u> | 46 | 24 | 14 | 10 | 30 | 3 | <u>15</u> | 1.9 | 7.0 | 0.92 | 770 | 1025 | 19 | <u>19475</u> | X |
| 13 | B | <u>13</u> | 47 | 22 | 14 | 8 | 31 | <u>15</u> | 0 | <u>5.0</u> | <u>12.0</u> | 0.93 | <u>510</u> | <u>910</u> | 28 | 25480 | X |
| 14 | B | <u>14</u> | 45 | 21 | 12 | 9 | 34 | 4 | <u>15</u> | 1.8 | 7.0 | 0.95 | 820 | 1040 | 17 | <u>17680</u> | X |
| 15 | B | <u>15</u> | 47 | 22 | 14 | 8 | 31 | <u>15</u> | 1 | <u>5.0</u> | <u>12.0</u> | 0.94 | <u>520</u> | <u>900</u> | 28 | 25200 | X |
| 16 | B | <u>16</u> | <u>30</u> | <u>14</u> | 8 | 6 | <u>56</u> | 3 | 3 | 2.0 | 7.0 | 0.91 | 710 | <u>860</u> | 27 | <u>23220</u> | X |
| 17 | B | <u>17</u> | <u>70</u> | <u>30</u> | 8 | <u>22</u> | <u>0</u> | 0 | 0 | — | — | 1.00 | <u>600</u> | 1080 | 17 | <u>18360</u> | X |
| 18 | B | <u>18</u> | 45 | 22 | 13 | 9 | 33 | <u>12</u> | 1 | <u>6.0</u> | <u>12.0</u> | 0.95 | <u>510</u> | <u>890</u> | 28 | 24920 | X |
| 19 | B | <u>19</u> | <u>30</u> | <u>14</u> | 8 | 6 | <u>56</u> | <u>13</u> | 3 | <u>5.0</u> | 7.0 | 0.92 | <u>610</u> | <u>920</u> | 26 | <u>23920</u> | X |
| 20 | B | <u>20</u> | <u>35</u> | <u>41</u> | <u>4</u> | <u>37</u> | 24 | 3 | 3 | 2.0 | 7.0 | <u>0.80</u> | <u>600</u> | 1150 | 14 | <u>16100</u> | X |
| 21 | B | <u>21</u> | 45 | 25 | 17 | 8 | 30 | 3 | 3 | 2.0 | 7.0 | <u>0.81</u> | 710 | 1010 | 21 | <u>21210</u> | X |
| 22 | B | <u>22</u> | <u>30</u> | <u>45</u> | <u>4</u> | <u>41</u> | 25 | 3 | 3 | 2.0 | 7.0 | <u>0.80</u> | <u>610</u> | 1170 | 13 | <u>15210</u> | X |
| 23 | B | <u>23</u> | 45 | 15 | <u>3</u> | 12 | 40 | 3 | 3 | 2 0 | 7 0 | <u>0.80</u> | 720 | <u>955</u> | 17 | <u>16235</u> | X |
| 24 | B | <u>24</u> | 47 | 14 | <u>3</u> | 11 | 39 | 3 | 3 | 2.0 | 7.0 | <u>0.80</u> | 730 | <u>950</u> | 17 | <u>16150</u> | X |

(Underlined: Out of the range of the invention,
—: Not measurable,
BF: bainitic ferrite,
M: martensite,
γR: retained austenite,
α: ferrite,
SG: sub-grain
○: YS ≥ 700 MPa and TS ≥ 1000 MPa and TS × EL ≥ 24000 MPa · %,
X: Not satisfying the conditions "○" on the left)

TABLE 5

(Continued from Table 4)

| Steel No. | Steel grade symbol | Heat treatment No. | BF | M + γR | γR | M | α | α having 5μm+ | Worked α | Avg recrys α/SG (μm) | Avg TiC (μm) | CγR (wt%) | YS (MPa) | TS (MPa) | EL (%) | TS×EL | Eval |
|---|---|---|---|---|---|---|---|---|---|---|---|---|---|---|---|---|---|
| 25 | C | 25 | 47 | 21 | 14 | 7 | 32 | 3 | 3 | 2.0 | 7.0 | 0.95 | 740 | 1030 | 24 | 24720 | ○ |
| 26 | <u>D</u> | 26 | 45 | 16 | 3 | 13 | 39 | <u>20</u> | 0 | <u>6.0</u> | 8.0 | 0.92 | <u>510</u> | <u>910</u> | 28 | 25480 | X |
| 27 | E | 27 | 45 | 22 | 9 | 13 | 33 | 3 | 3 | 2.0 | 7.0 | 0.93 | 710 | 1020 | 24 | 24480 | ○ |
| 28 | F | 28 | 45 | 25 | 16 | 9 | 30 | 3 | 3 | 2.0 | 7.0 | 0.94 | 720 | 1050 | 25 | 26250 | ○ |

TABLE 5-continued (Continued from Table 4)

| Steel No. | Steel grade symbol | Heat treatment No. | Area ratio (%) | | | | | | Average particle diameter of recrystallized α and SG (μm) | Average particle diameter of TiC in α (μm) | CγR (wt %) | Mechanical property | | | | Evaluation |
|---|---|---|---|---|---|---|---|---|---|---|---|---|---|---|---|---|
| | | | BF + γR | γR | M | α | α having particle diameter of 5 μm or more in α | Worked α in α | | | | YS (MPa) | TS (MPa) | EL (%) | TS × EL (MPa · %) | |
| 29 | G | 29 | 30 | 50 | 4 | 46 | 20 | 3 | 3 | 2.0 | 7.0 | 0.80 | 620 | 1180 | 12 | 14160 | X |
| 30 | H | 30 | 45 | 16 | 4 | 12 | 39 | 3 | 3 | 2.0 | 7.0 | 0.80 | 705 | 910 | 20 | 18200 | X |
| 31 | I | 31 | 47 | 28 | 14 | 14 | 25 | 3 | 3 | 2.0 | 7.0 | 0.94 | 740 | 1100 | 22 | 24200 | ○ |
| 32 | J | 32 | 47 | 28 | 14 | 14 | 25 | 3 | 3 | 2.0 | 7.0 | 0.93 | 750 | 1110 | 22 | 24420 | ○ |
| 33 | K | 33 | 47 | 25 | 4 | 20 | 28 | 14 | 1 | 6.0 | 9.0 | 0.78 | 590 | 1100 | 19 | 20900 | X |
| 34 | L | 34 | 55 | 18 | 8 | 10 | 27 | 13 | 1 | 6.0 | 9.0 | 0.80 | 550 | 1010 | 21 | 21210 | X |
| 35 | M | 35 | 45 | 27 | 13 | 14 | 28 | 4 | 1 | 2.0 | 8.0 | 0.93 | 750 | 1110 | 22 | 24420 | ○ |
| 36 | N | 36 | 45 | 28 | 14 | 14 | 27 | 4 | 1 | 2.0 | 8.0 | 0.94 | 740 | 1120 | 22 | 24640 | ○ |
| 37 | O | 37 | 45 | 27 | 13 | 14 | 28 | 3 | 0 | 2.0 | 7.0 | 0.92 | 780 | 1100 | 22 | 24200 | ○ |
| 38 | P | 38 | 30 | 50 | 3 | 47 | 20 | 2 | 4 | 2.0 | 7.0 | 0.80 | 610 | 1220 | 10 | 12200 | X |
| 39 | Q | 39 | 45 | 25 | 14 | 11 | 30 | 13 | 0 | 6.0 | 6.0 | 0.93 | 550 | 1010 | 24 | 24240 | X |
| 40 | R | 40 | 46 | 24 | 14 | 10 | 30 | 4 | 3 | 3.0 | 7.0 | 0.93 | 700 | 1000 | 24 | 24000 | ○ |
| 41 | S | 41 | 45 | 25 | 14 | 11 | 30 | 10 | 3 | 5.0 | 9.0 | 0.94 | 650 | 1030 | 24 | 24720 | X |
| 42 | T | 42 | 46 | 25 | 15 | 10 | 29 | 3 | 3 | 2.0 | 7.0 | 0.95 | 730 | 1045 | 25 | 26125 | ○ |
| 43 | U | 43 | 45 | 24 | 15 | 9 | 31 | 3 | 3 | 2.0 | 7.0 | 0.95 | 740 | 1050 | 25 | 26250 | ○ |
| 44 | V | 44 | 46 | 24 | 15 | 9 | 30 | 3 | 3 | 2.0 | 7.0 | 0.95 | 730 | 1050 | 25 | 26250 | ○ |
| 45 | W | 45 | 47 | 25 | 15 | 10 | 28 | 3 | 3 | 2.0 | 7.0 | 0.95 | 740 | 1045 | 25 | 26125 | ○ |
| 46 | X | 46 | 50 | 27 | 14 | 13 | 23 | 3 | 3 | 2.0 | 7.0 | 0.95 | 730 | 1090 | 24 | 26160 | ○ |
| 47 | Y | 47 | 46 | 25 | 15 | 10 | 29 | 3 | 3 | 2.0 | 7.0 | 0.95 | 740 | 1050 | 25 | 26250 | ○ |

(Underlined: Out of the range of the invention,
—: Not measurable,
BF: bainitic ferrite,
M: martensite,
γR: retained austenite,
α: ferrite,
SG: sub-grain
○: YS ≥ 700 MPa and TS ≥ 1000 MPa and TS × EL ≥ 24000 MPa · %,
X: Not satisfying the conditions "○" on the left)

As shown in Tables 4 and 5, each of steels Nos. 1, 2, 25, 27, 28, 31, 32, 35 to 37, 40, and 42 to 47 is a steel sheet of the present invention satisfying the requirements for the microstructure of the invention as a result of manufacture under the heat treatment conditions according to the invention by using steel grade satisfying the range of the component composition of the invention, in which mechanical properties (YS, TS, TS×EL) satisfy the criteria of judgment and high strength steel sheets having tensile strength, yield strength and formability together were obtained.

On the contrary, steels Nos. 3 to 24, 26, 29, 30, 33, 34, 38, 39, and 41 are comparative steel sheets not satisfying the requirements for the chemical composition or not satisfying the requirements for the microstructure defined in the present invention and, accordingly, not satisfying the requirements for the microstructure, in which at least one of the mechanical properties (YS, TS, TS×EL) does not satisfy the criteria of judgment.

For example, steels Nos. 3 to 24 satisfy the requirements for the component composition but, since any of the manufacturing conditions is out of the range of the present invention, they do not satisfy at least one of essential requirements defining the microstructure of the present invention and, accordingly, at least one of YS, TS, TS×EL is poor.

Further, steel Nos. 26, 29, 30, 33, 34, 38, 39, and 41 are within a range of the present invention for the manufacturing conditions but, since they do not satisfy the requirements for defining the component of the present invention and, in addition, do not satisfy the essential requirements for defining the microstructure of the present invention, and at least one of YS, TS, EL, and λ.

For example, since steel No. 26 has too low C content, does not satisfy the inequality relation of the formula (2), retained γ is insufficient and recrystallized ferrite is coarsened, YS and TS are poor although TS×EL is excellent.

Further, since steel No. 29 has a too high silicon content, does not satisfy the inequality of the formula (1), the bainitic ferrite and retained γ are insufficient, and martensite is excessive, YS and TS×EL are poor although TS is excellent.

Further, since steel No. 30 has too low Si content, retained γ is insufficient, TS and TS×EL are poor although YS is excellent.

On the other hand, since steel No. 33 has too high Si content, does not satisfy any one of the inequality of the formulas (1) and (2), and martensite is excessive, YS and TS×EL are poor although TS is excellent.

Further, since steel No. 34 has too low Mn content, does not satisfy the inequality of the formula (2), and recrystallized ferrite is coarsened, YS and TS×EL are poor although TS is excellent.

On the other hand, since steel No. 38 has too high Mn content, does not satisfy the inequality of the formula (1), bainitic ferrite and retained γ are insufficient, and martensite is excessive, YS and TS×EL are poor, although TS is excellent.

Further, since steel No. 39 has too low Ti content and, accordingly, pinning effect due to TiC is decreased to make the recrystallized ferrite coarse, YS is poor although TS and TS×EL are excellent.

Further, since steel No. 41 does not satisfy the inequality relation of the formula (2), and the recrystallized ferrite is coarsened, YS is poor although TS and TS×EL are excellent.

While the present invention has been described specifically and with reference to the specific embodiments, it will be apparent to a person skilled in the art that various modification or changes are possible without departing the gist and the scope of the invention.

The present application is based on Japanese Patent Application filed on Jul. 12, 2012 (Patent Application No. 2012-156577), the content of which is incorporated herein for reference.

INDUSTRIAL APPLICABILITY

The high strength hot-dip galvanized steel sheet according to the present invention is useful for automobile parts such as suspension components of automobiles.

The invention claimed is:

1. A high strength hot-dip galvanized steel sheet, comprising:
a steel sheet having a galvanized layer formed on a surface thereof, the steel sheet including following components by mass %,
C: 0.05 to 0.3%,
Si: 1 to 3%,
Mn: 1 to 3%,
P: 0.1% or less (inclusive 0%),
S: 0.01% or less (inclusive 0%),
Ti: 0.02 to 0.2%,
Al: 0.001 to 0.1%,
N: 0.002 to 0.03%, and
iron,
wherein the steel sheet satisfies Formula (1) and Formula (2):

$$10[C]+0.4[Si]+[Mn] \leq 4.5 \quad \text{Formula (1), and}$$

$$0.8 \times (723-10.7[Mn]-16.9[Ni]+29.1[Si]+16.9[Cr])+ 0.2 \times (910-203\sqrt{[C]}+44.7[Si]+31.5[Mo]-30[Mn]-11[Cr]-20[Cu]+700[P]+400[Al]+400[Ti]) \leq 780 \quad \text{Formula (2)}$$

(where the components in [ ] indicate contents thereof in mass % in the steel sheet,
the steel sheet includes, by an area ratio based on an entire microstructure,
bainitic ferrite: 40 to 65%,
martensite+retained austenite: 15% or more,
the martensite: 15% or less,
the retained austenite: 5% or more, and
ferrite: 20 to 40%,
the retained austenite has a C concentration CγR of 0.9 mass % or more,
the steel sheet includes a plurality of ferrite particles including recrystallized ferrite particles and un-recrystallized ferrite particles such that an average grain diameter of the recrystallized ferrite and an average grain diameter of sub-grains in the un-recrystallized ferrite particles are each 3 μm or less,
the steel sheet includes ferrite particles having a grain diameter of 5 μm or more such that an area ratio of the ferrite particles having a grain diameter of 5 μm or more is 5% or less,
the steel sheet includes worked ferrite such that an area ratio of the worked ferrite is 5% or less, and
the ferrite particles include TiC particles having an average grain diameter of 10 nm or less.

2. The high strength hot-dip galvanized steel sheet according to claim 1, wherein the steel sheet further includes at least one of:
Cr: 0.01 to 3%,
Mo: 0.01 to 1%,
Cu: 0.01 to 2%,
Ni: 0.01 to 2%,
B: 0.00001 to 0.001%,
Ca: 0.0005 to 0.01%/,
Mg: 0.0005 to 0.01%, and
REM: 0.0001 to 0.01%.

3. The high strength hot-dip galvanized steel sheet according to claim 1, wherein the steel sheet further includes 0.01 to 3% of Cr.

4. The high strength hot-dip galvanized steel sheet according to claim 1, wherein the steel sheet further includes 0.01 to 1% of Mo.

5. The high strength hot-dip galvanized steel sheet according to claim 1, wherein the steel sheet further includes 0.01 to 2% of Cu.

6. The high strength hot-dip galvanized steel sheet according to claim 1, wherein the steel sheet further includes 0.01 to 2% of Ni.

7. The high strength hot-dip galvanized steel sheet according to claim 1, wherein the steel sheet further includes 0.00001 to 0.001% of B.

8. The high strength hot-dip galvanized steel sheet according to claim 1, wherein the steel sheet further includes 0.0005 to 0.01% of Ca.

9. The high strength hot-dip galvanized steel sheet according to claim 1, wherein the steel sheet further includes 0.0005 to 0.01% of Mg.

10. The high strength hot-dip galvanized steel sheet according to claim 1, wherein the steel sheet further includes 0.0001 to 0.01% of REM.

11. The high strength hot-dip galvanized steel sheet according to claim 1, wherein the steel sheet includes 0.10 to 0.3% of C.

12. The high strength hot-dip galvanized steel sheet according to claim 1, wherein the steel sheet consists of C, Si, Mn, P, S, Ti, Al, N, and the balance being iron and unavoidable impurities.

13. The high strength hot-dip galvanized steel sheet according to claim 12, wherein the steel sheet further includes at least one of:
Cr: 0.01 to 3%,
Mo: 0.01 to 1%,
Cu: 0.01 to 2%,
Ni: 0.01 to 2%,
B: 0.00001 to 0.001%,
Ca: 0.0005 to 0.01%,
Mg: 0.0005 to 0.01%, and
REM: 0.0001 to 0.01%.

* * * * *